Figure 1:
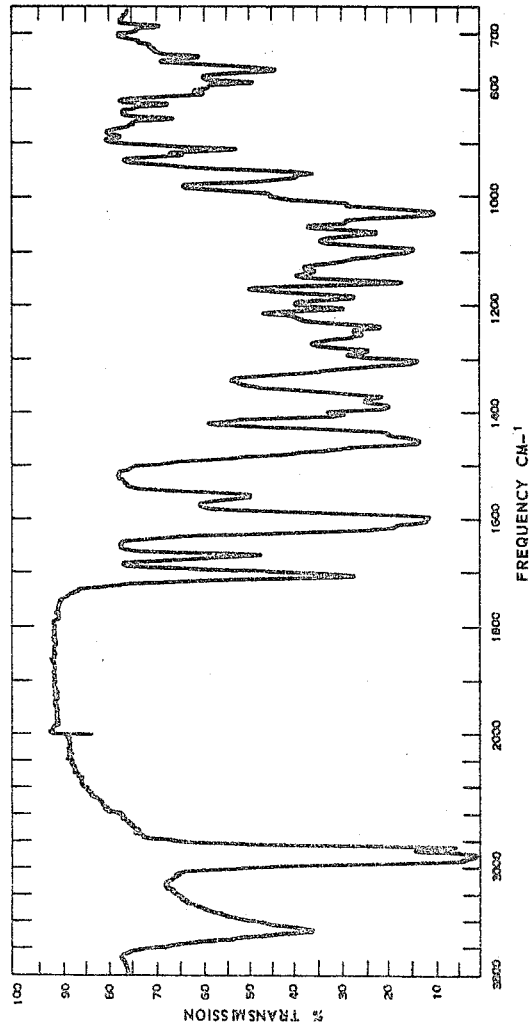

United States Patent Office 3,309,273
Patented Mar. 14, 1967

3,309,273
ANTIBIOTIC STEFFISBURGENSIMYCIN AND METHOD OF PRODUCING
Malcolm E. Bergy and John H. Coats, Kalamazoo, and Fritz Reusser, Portage, Mich., assignors to The Upjohn Company, Kalamazoo, Mich., a corporation of Delaware
Filed Dec. 29, 1965, Ser. No. 527,634
8 Claims. (Cl. 167—65)

This invention relates to a novel composition of matter and to a process for the production thereof. More particularly, this invention relates to a new compound, steffisburgensimycin (U-20661), and to a process for the production thereof.

Steffisburgensimycin is a chemical compound which is producible by culturing a steffisburgensimycin-producing actinomycete in an aqueous nutrient medium. It is a neutral chemical compound which has the property of adversely affecting the growth of Gram-positive bacteria, for example, *Bacillus subtilis, Bacillus cereus, Staphylococcus aureas, Sarcina lutea*, and *Mycobacterium avium*, and can be used alone or in combination with other antibacterial agents to prevent the growth of, or reduce the number of, such microorganisms present in various environments. For example, it can be used as a disinfectant on various dental and medical equipment contaminated with *Staphylococcus aureus*. It can also be used as a feed supplement to promote the growth of animals, for example, mammals, birds, fish, and reptiles.

THE MICROORGANISM

The actinomycete used according to this invention for the production of steffisburgensimycin has been designated as *Streptomyces steffisburgensis* var. *steffisburgensis* nov. sp. One of its strain characteristics is the production of steffisburgensimycin. A subculture of the living organism can be obtained from the permanent collection of the Northern Utilization and Research Division, Agricultural Research Service, U.S. Department of Agriculture, Peoria, Illinois, U.S.A. Its accession number in this repository is NRRL 3193.

The characteristics of *Streptomyces steffisburgensis* var. *steffisburgensis* nov. sp., NRRL 3193, are given in the following tables:

Table I: Appearance on Ektachrome
Table II: Assimilation of Carbon Compounds in Synthetic Medium (J. Bact. 56: 107–114, 1948)
Table III: Cultural characteristics
Table IV: Color—According to the Color Harmony Manual, 3rd Edition, 1948, and the ISCC–NBS Method of Designating Colors and a Dictionary of Color Names, NBS Circular 553.
Table V: Microscopic characteristics

TABLE I
[Appearance on Ektachrome[1] of *S. steffisburgensis* v. *steffisburgensis*]

| Agar medium | Appearance | |
|---|---|---|
| Bennett's | No aerial growth. | Tan-brown reverse. |
| Czapek's sucrose | No aerial growth. | Yellow-tan reverse. |
| Maltose tryptone | No aerial growth. | Brown reverse. |
| Peptone-iron | No aerial growth. | Brown reverse. |
| 0.1% tyrosine | No aerial growth. | Red-tan reverse. |
| Casein starch | No aerial growth. | Tan-brown reverse. |

[1] Dietz, A., "Ektachrome Transparencies as Aids in Actinomycete Classification," Annals of the New York Academy of Sciences, 60: 152–154, 1954.

TABLE II
[Assimilation of Carbon Compounds in Synthetic Medium By *S. steffisburgensis* v. *steffisburgensis*]

| | | |
|---|---|---|
| 1 | Control | − |
| 2 | D-xylose | + |
| 3 | L-arabinose | + |
| 4 | Rhamnose | + |
| 5 | D-fructose | + |
| 6 | D-galactose | + |
| 7 | D-glucose | + |
| 8 | D-Mannose | + |
| 9 | Maltose | + |
| 10 | Sucrose | + |
| 11 | Lactose | + |
| 12 | Cellobiose | + |
| 13 | Raffinose | + |
| 14 | Dextrin | + |
| 15 | Inulin | + |
| 16 | Soluble starch | + |
| 17 | Glycerol | + |
| 18 | Dulcitol | (−) |
| 19 | D-mannitol | + |
| 20 | D-sorbitol | (+) |
| 21 | Inositol | + |
| 22 | Salicin | (+) |
| 23 | Phenol | − |
| 24 | Cresol | − |
| 25 | Na formate | − |
| 26 | Na oxalate | (−) |
| 27 | Na tartrate | (−) |
| 28 | Na salicylate | − |
| 29 | Na acetate | − |
| 30 | Na citrate | (+) |
| | Na succinate | (+) |

+ —Positive assimilation.
(+)—Positive assimilation, slight growth.
(−)—Slight growth, no assimilation.
− No growth.

TABLE III
[Cultural characteristics—*S. steffisburgensis* v. *steffisburgensis*]

| Agar medium | Surface | Reverse | Other |
|---|---|---|---|
| Peptone-Iron | No aerial growth | Brown | Brown pigment. Melanin positive. |
| Calcium Malate | Trace white aerial growth | Colorless | No pigment. Malate solubilized (±). |
| Glucose Asparagine | Very slight trace of gray-white aerial growth. | Yellow | No pigment. |
| Skim Milk Agar | Very slight trace of gray-aerial growth. | Tan | Tan pigment. Casein not solubilized. |
| Tyrosine | Trace gray-white aerial growth | Pink-tan | Pink-tan Pigment. Tyrosine not solubilized. |
| Xanthine | Trace gray-white aerial growth | Brown | Brown pigment. Xanthine solubilized. |
| Nutrient Starch | Trace gray-white aerial growth | Pale yellow-tan | No pigment. |
| Yeast Extract-Malt Extract | Fair-gray-white aerial growth. | Tan | Red-tan pigment. |
| Bennett's, ° C.: | | | |
| 18 | No growth | | |
| 24 | No aerial growth | Yellow-tan | No pigment. |
| 28 | Trace gray aerial growth | Pink-tan | Pink-tan pigment. |
| 37 | Trace gray-pink aerial growth | do | Do. |
| 55 | No aerial growth | Trace colorless vegetative growth at 24 hours. | No pigment. |

TABLE III—Continued

| Agar medium | Surface | Reverse | Other |
|---|---|---|---|
| Czapek's, °C.: | | | |
| 18 | No growth | Yellow | No pigment. |
| 24 | None to trace gray aerial growth | Yellow | Do. |
| 28 | None to trace gray aerial growth | do | Do. |
| 37 | Pink-tan aerial growth | Yellow-pink | Do. |
| 55 | No aerial growth | Trace colorless vegetative growth at 24 hours. | Do. |
| Maltose-Tryptone, °C.: | | | |
| 18 | No growth | Yellow | Yellow-tan pigment. |
| 24 | Trace gray-pink aerial growth | Pink-tan | Pink-tan pigment. |
| 28 | Gray-pink aerial growth | do | Do. |
| 37 | Gray-pink aerial growth | do | No pigment. |
| 55 | No aerial growth | Trace colorless vegetative growth at 24 hours. | |
| Gelatin: | | | |
| Medium Plain | | | Brown pigment in upper ¼ of medium. Liquefaction in pigment area. |
| Nutrient | | | Tan pigment in upper ¼ of medium. Liquefaction in pigment area. |
| Broth Medium: | | | |
| Nutrient Nitrate | | | Colorless surface growth. Colorless flocculent growth at base. No pigment. Nitrate not reduced to nitrite. |
| Synthetic Nitrate | | | Colorless surface growth. Colorless flocculent growth at base. No Pigment to trace tan pigment. Nitrate not reduced to nitrite. |
| Litmus Milk | | | Colorless surface ring. Partial reduction. pH 6.3-6.6. |

TABLE IV
[Color Characteristics—S. steffisburgensis v. steffisburgensis]

| Medium | Color Harmony Manual, 3rd Ed., 1948 | ISCC-NBS Color Names, Circular 553, 1955 |
|---|---|---|
| Bennett's Agar: | | |
| Surface | 3 ig. beige brown, mist brown | 80 m. grayish yellowish brown; 95 g. moderate olive brown. |
| Reverse | 31 g. adobe brown, cinnamon brown, light brown. | 77 gm. moderate yellowish brown. |
| Pigment | None | |
| Czapek's Sucrose Agar: | | |
| Surface | 2 ie. light mustard tan | 91 gm. dark grayish yellow; 94 g. light olive brown; 106 g. light olive. |
| Reverse | 2 ie. light mustard tan | 91 gm. dark grayish yellow; 94 g. light olive brown; 106 g. light olive. |
| Pigment | None | |
| Maltose Tryptone Agar: | | |
| Surface | a white, 3 ge. beige camel | 263 gm. white; 79 m. light grayish yellowish brown; 94 m. light olive brown. |
| Reverse | 3 ng. yellow maple | 77 m. moderate yellowish brown. |
| Pigment | 3 ie. camel, maple sugar, tan | 76 m. light yellowish brown; 77 g. moderate yellowish brown. |

TABLE V
[Microscopic Characteristics of S. steffisburgensis v. steffisburgensis]

| | |
|---|---|
| Light Microscope | Sporophores short, straight to open spiral to spiral. |
| Electron microscope | Spores with short spines. |

The new compound of the invention is produced when the elaborating organism is grown in an aqueous nutrient medium under submerged aerobic conditions. It is to be understood also that for the preparation of limited amounts surface cultures in bottles can be employed. The organism is grown in a nutrient medium containing a carbon source, for example, an assimilable carbohydrate and a nitrogen source, for example, an assimilable nitrogen compound or proteinaceous material. Preferred carbon sources include glucose, brown sugar, sucrose, glycerol, starch, corn starch, lactose, dextrin, molasses, and the like. Preferred nitrogen sources include corn steep liquor, yeast, autolyzed brewer's yeast with milk solids, soybean meal, cottonseed meal, cornmeal, milk solids, pancreatic digest of casein, distiller's solubles, animal peptone liquors, meat and bone scraps, and the like. Combination of these carbon and nitrogen sources can be used advantageously. Trace metals, for example, zinc, magnesium, manganese, cobalt, iron, and the like need not be added to the fermentation media since tap water and unpurified ingredients are used as media components.

Production of the compound of the invention can be effected at any temperature conducive to satisfactory growth of the microorganism, for example, between about 18° and 40° C. and preferably between about 20° and 30° C. Ordinarily, optimum production of the compound is obtained in about 2 to 10 days. The medium normally stays fairly close to neutral, or on the alkaline side during the fermentation. The final pH is dependent, in part, on the buffer present, if any, and in part on the initial pH of the culture medium which is advantageously adjusted to about pH 7.2 prior to sterilization.

When growth is carried out in large vessels and tanks, it is preferable to use the vegetative form, rather than the spore form, of the microorganism for inoculation to avoid a prounced lag in the production of the new compound and the attendant inefficient utilization of the equipment. Accordingly, it is desirable to produce a vegetative inoculum in a nutrient broth culture by inoculating the broth culture with an aliquot from a soil or slant culture. When a young, active vegetative inoculum has thus been secured, it is transferred aseptically to large vessels or tanks. The medium in which the vegetative inoculum is produced can be the same as, or different from, that utilized for the production of the new compound, as long as it is such that a good growth of the microorganism is obtained.

The new compound of the invention is a neutral chemical compound having the formula $C_{28}H_{30}O_{13}$. It is soluble in lower alkanols, e.g., methanol, ethanol, isopropanol, the butanols, and the like; chlorinated lower-alkanes, e.g., methylene chloride, chloroform, ethylene dichloride, and the like; lower alkanones, e.g., actone, methyl ethyl ketone, and the like; and, it is soluble in concentration less than 5 mg./ml. in water, diethyl ether, and cyclohexane.

A variety of procedures can be employed in the isolation and purification of steffisburgensimycin, for example, solvent extraction, liquid-liquid distribution in a Craig apparatus, and crystallzation from solvents. Solvent extraction procedures are preferred for commercial production inasmuch as they are less time consuming and less expensive.

In a preferred process, steffisburgensimycin is recovered from its culture medium by separation of the mycelia and undissolved solids by conventional means such as by filtration or centrifugation. The antibiotic is then removed from the filtered or centrifuged broth by extraction. For the extraction of steffisburgensimycin from the filtered broth, solvents in which it is soluble, as disclosed above, can be used. Methylene chloride is the preferred extraction solvent. The extract obtained by methylene chloride extraction can be evaporated to dryness to provide the crude antibiotic directly. This preparation can be used in environments where higher purity of the antibiotic is not necessary.

Steffisburgensimycin also can be extracted from filtered fermentation beer using alternatively such water-immiscible solvents as ethyl acetate, amyl acetate, methyl ethyl ketone, 1-butanol, 2-butanol, and chloroform, at pH's from about 3.0 to about 7.0. Also, at pH 10.0 steffisburgensimycin is not appreciably extracted from filtered beer using methylene chloride, ethyl acetate, or methyl ethyl ketone, therefore, an alternate recovery process can be an extraction into solvent at pH 3.0 to 7.0 using, for example, methylene chloride, and then extracting the activity back into water at pH 10 followed by another extraction with a suitable solvent, as disclosed above, at pH 3.0–7.0, followed by concentration to dryness or crystallization of the antibiotic.

High purity steffisburgensimycin can be obtained by subjecting an impure dry preparation of steffisburgensimycin, as obtained above, to crystallization from various solvents. For example, an impure preparation of steffisburgensimycin can be dissolved in boiling isopropanol. The solution can be clarified by filtration and concentrated in vacuo and then heated to a temperature of from 40 to 60° C. at which point crystallization of the antibiotic starts. The crystalline mixture can be maintained overnight at a temperature of about −10 to −30° C., and then the crystals of steffisburgensimycin can be removed by filtration. The crystals of steffisburgensimycin can be washed with cold isopropanol and dried in vacuo to yield a high purity crystalline preparation of steffisburgensimycin. High purity steffisburgensimycin can also be crystallized from such solvents as water, lower alcohols, e.g., methanol and ethanol, esters, e.g., ethyl acetate, ketones, e.g., acetone and methyl ethyl ketone.

The new compound of the invention, steffisburgensimycin, inhibits the growth of various Gram-positive bacteria. For example, it is active against Bacillus subtilis, Bacillus cereus, Staphylococcus aureus, Sarcina lutea, and Mycobacterium avium. Accordingly, steffisburgensimycin can be used as a disinfectant on washed and stacked food utensils contaminated with Staphylococcus aureus. It can also be used in birds and rabbits to control the organism Mycobacterium avium which is a known producer of generalized tuberculosis in these animals. Steffisburgensimycin can also be used in papermill operations to control the contamination of wool by the organism Bacillus cereus. It can also be used in petroleum products storage to control the microorganism Bacillus subtilis which is a known slime and corrosion producer in petroleum products storage. Also, it can be used as a pH indicator, i.e., it imparts a yellow color when incorporated into a acidic solution and a red-violet color when incorporated into a basic solution.

The following examples are illustrative of the process and products of the present invention but are not to be construed as limiting. All percentages are by weight, and solvent mixture proportions are by volume unless otherwise noted.

*Example 1*

A. FERMENTATION

A soil stock of Streptomyces steffisburgensis var. steffisburgensis, NRRL 3193, was used to inoculate a series of 500-ml. Erlenmeyer flasks, each containing 100 ml. of sterile, preseed medium consisting of the following ingredients:

| | G./liter |
|---|---|
| Glucose monohydrate | 25 |
| Pharmamedia* | 25 |
| Tap water, q.s. | Balance |

*Pharmamedia is an industrial grade of cottonseed flour produced by Trader's Oil Mill Company, Fort Worth, Tex.

The flasks were grown for three days at 28° C. on a Gump rotary shaker operating at 250 r.p.m.

One shake flask (100 ml.) of the pressed inoculum, described above, was used to inoculate a 20–liter seed tank containing 13 liters of sterile seed medium consisting of the following ingredients:

| | G./liter |
|---|---|
| Glucose monohydrate | 10 |
| Corn steep liquor | 10 |
| Pharmamedia | 2 |
| Wilson's Peptone Liquor No. 159* | 10 |
| Tap water | Balance |

*Wilson's Peptone Liquor No. 159 is a preparation of hydrolyzed proteins of animal origin.

The seed tank was grown for 2 days at a temperature of 28° C., with aeration at a rate of 10 standard liters per minute, and agitation at a rate of 400 r.p.m.

The seed tank, described above, was used to inoculate a 400-liter fermentor containing 250 liters of the following sterile medium:

| | G./liter |
|---|---|
| Corn steep liquor | 20 |
| Glycerol | 20 |
| Sodium chloride | 5 |
| Tap water | Balance |

Before sterilization of the medium, the pH of the medium was adjusted to 7.2 with a 50% aqueous solution of sodium hydroxide, and 10 g./liter of calcium carbonate was added. The fermentation cycle was 6 days during which time the temperature was controlled at 28° C., filtered air was supplied at a rate of 80 standard liters/min., and agitation at the rate of 260 r.p.m. Sterile lard oil was added to control foaming. A representative steffisburgensimycin fermentation assayed 8.8 biounits/ml. at 130 hours against the microorganism S. lutea. The assay against Sarcina lutea is conducted on agar buffered to pH 6 with pH 6.0 phosphate buffer. A unit volume (0.08 ml.) of solution containing the material to be assayed is placed on a 12.7 mm. assay disc which is then placed on an agar plate seeded with the assay microorganism. A biounit (bu.) is defined as the concentration of the antibiotic which gives a 20 mm. zone of inhibition under the standard assay conditions. Thus, if for example a fermentation beer has to be diluted 1/100 to give the 20 mm. zone of inhibition, the potency of such beer is 100 bu. per ml.

B. EXTRACTION

The whole beer from a steffisburgensimycin fermentation, as described above, was adjusted to pH 6.0 with 5.0 normal sulfuric acid. The acidified whole beer was then filtered with the aid of diatomaceous earth as a filter aid. The filter cake was washed with a one-tenth volume of water (based on the beer volume). The combined clear beer and cake wash was extracted with a one-tenth volume of cyclohexane and the cyclohexane phase was discarded. The aqueous phase was extracted at pH 6.0 with an equal volume of methylene chloride and the extracted aqueous phase was discarded. The methylene chloride extract was concentrated in vacuo at less than 40° C. to yield a dry impure preparation of steffisburgensimycin.

C. PURIFICATION

A methylene chloride concentrate of steffisburgensimycin, as obtained by the procedure described in part B above, was dissolved in 250-ml. of boiling isopropanol. The solution was clarified by filtration, and then concentrated in vacuo at less than 40° C. to a volume of 65 ml. The concentrate was heated to approximately 50° C. where crystallization of steffisburgensimycin started. After holding the mixture overnight at −18° C., the crystals of steffisburgensimycin were removed by filtration, washed with 2 ml. of cold isopropanol, and dried in vacuo to a constant weight of 450 mg. These crystals of steffisburgensimycin had a potency of 73.0 biounits/mg. on the *S. lutea* assay, described above. The balance sheet for the above-described recovery and purification procedures is as follows:

| Step | Quantity | Assay |
|---|---|---|
| Whole beer | 4,000 ml | 12.6 biounits/ml. |
| Clear beer | 3,600 ml | 10 biounits/ml. |
| Methylene chloride extracts | 3,400 ml | 7.2 biounits/ml. |
| Crystalline steffisburgensimycin | 450 mg | 73 biounits/mg. |

CHARACTERIZATION OF STEFFISBURGENSIMYCIN

Crystals: Yellow-light orange crystals. In aqueous solution the color is yellow and in strong base it is red-violet.

Elemental analysis: Found: C, 58.31; H, 5.52; O, 35.89.

Optical rotation: $[\alpha]_D^{25} +85°$ (c., 0.054% in methanol).

Solubility: It is soluble in lower alkanols, e.g., methanol, ethanol, isopropanol, the butanols, and the like; chlorinated lower-alkanes, e.g., methylene chloride, chloroform, ethylene dichloride, and the like; lower-alkanones, e.g., acetone, methyl ethyl ketone, and the like; it is soluble in concentrations less than 5 mg./ml. in water, diethyl ether, and cyclohexane.

UV spectrum:
.01 N HCl in methanol—
 Max at 214 mu, $a=43.42$
 Sh. at 255 mu, $a=38.70$
 Sh. at 300 mu, $a=22.24$
 Max at 236 mu, $a=50.37$
 Max at 278 mu, $a=34.91$
 Max at 439 mu, $a=26.71$
Molecular weight: 574 (mass spectrometer).
Methanol—
 Max at 214 mu, $a=45.23$
 Max at 236 mu, $a=51.04$
 Sh. at 255 mu, $a=38.92$
 Max at 278 mu, $a=35.14$
 Sh. at 298 mu, $a=23.61$
 Max at 439 mu, $a=25.94$
.01 N KOH in methanol—
 Max at 227 mu, at $a=51.93$
 Max at 263 mu, $a=42.86$
 Max at 353 mu, $a=7.20$
 Max at 528 mu, $a=19.44$ Infrared spectrum: The infrared absorption spectrum of steffisburgensimycin suspended in mineral oil mull is reproduced in FIG. 1 of the drawing. Steffisburgensimycin shows peaks at the following wave lengths expressed in reciprocal centimeters:

| | |
|---|---|
| 3470 (M) | 1163 (S) |
| 2940 (S) (oil) | 1143 (M) |
| 2920 (S) (oil) | 1123 (M) |
| 2850 (S) (oil) | 1105 (S) |
| 2720 (W) | 1070 (S) |
| 1710 (S) | 1053 (M) |
| 1672 (M) | 1037 (S) |
| 1620 (S) | 1020 (M) |
| 1610 (S) | 1005 (M) |
| 1605 (S) | 970 (M) |
| 1560 (M) | 962 (M) |
| 1510 (W) | 925 (W) |
| 1463 (S) | 913 (M) |
| 1445 (S) | 893 (W) |
| 1410 (M) | 870 (W) |
| 1395 (S) | 858 (W) |
| 1376 (S) (oil) | 832 (W) |
| 1310 (S) | 812 (W) |
| 1293 (S) | 800 (W) |
| 1268 (M) | 793 (M) |
| 1260 (S) | 769 (M) |
| 1245 (S) | 745 (W) |
| 1228 (M) | 725 (W) |
| 1212 (M) | 698 (W) |
| 1193 (S) | 690 (W) |

Band intensities are indicated as "S," "M," and "W," respectively, and are approximated in terms of the backgrounds in the vicinity of the band. An "S" band is of the same order of intensity as the strongest in the spectrum; "M" bands are between one-third and two-thirds as intense as the strongest band, and "W" bands are less than one-third as intense as the strongest band. These estimates are made on the basis of a percent transmission scale.

Figure 2:
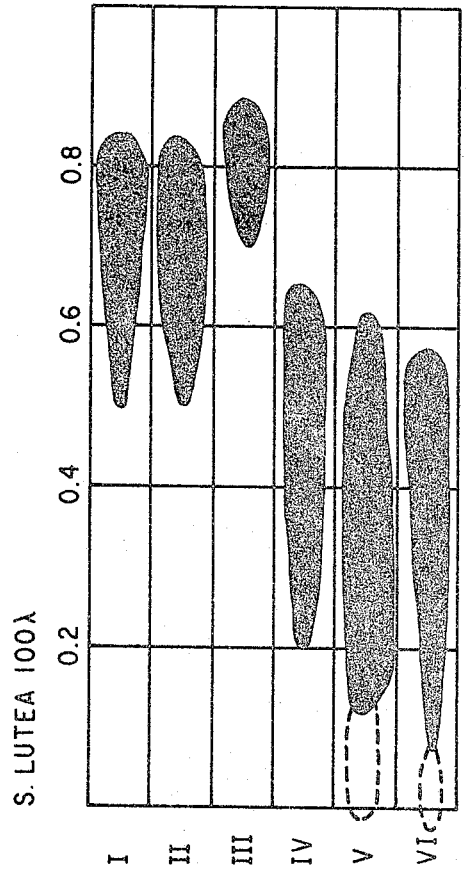

Papergram: The paper chromatographic pattern of steffisburgensimycin in the following solvent systems is as shown in FIG. 2 of the drawing.

I. 1-butanol, water (84:16), 16 hours
II. 1-butanol, water (84:16) plus 0.25% p-toluenesulfonic acid, 16 hours
III. 1-butanol, acetic acid, water (2:1:1), 16 hours
IV. 2% piperidine (V/V) in 1-butanol, water (84:16), 16 hours
V. 1-butanol, water (4:96), 5 hours
VI. 1-butanol, water (4:96), plus 0.25% p-toluenesulfonic acid, 5 hours

*Antitumor activity.*—Steffisburgensimycin inhibits the growth of KB cells (human epidermoid carcinoma cells) in tissue culture assay. The assay procedure is as disclosed in Cancer Research, vol. 19, No. 8, pp. 843–46, September 1959.

*Antifungal activity.*—Steffisburgensimycin inhibits the growth of *Nocardia asteroides* and *Blastomyces dermatitidis* on an agar dilution assay at a concentration of 10 mcg. of steffisburgensimycin per ml. of agar medium. (The test compound is incorporated in agar in Petri dishes at concentrations of 1, 10, 100 and 1000 mcg./ml. Suspensions of the test fungi are streaked on the agar surface. After incubation for 72 hours at 28° C., the Petri dishes are examined and the degree of inhibition of growth observed.)

*Antiviral activity.*—Steffisburgensimycin demonstrates antiviral activity against *Herpes simplex* in mice. The test procedure is as follows: The test compound is administered I.P. to virus-infected mice (weanling white Swiss, the October Hills strain). Four doses of the test compound are given before infection: 44-, 26-, 19-, and 3-hour prophylactic. Five additional doses are given after infection: 4-, 21-, 28-, 45-, and 52-hour therapeutic. Twenty mice are used in each group. The test runs a total of 12 days. Deaths are recorded twice daily.

Herpes

| | |
|---|---|
| Size of mice | 12 grams. |
| Infection route | Intraperitoneal. |
| Challenge virus | 30 LD$_{50}$. |
| Tissue tropism | Brain. |

For herpes virus, delta ($\Delta$) values (treated minus infected control) are calculated for 50% survival time (ST$_{50}$) of mice that die. The minimum $\Delta$ST$_{50}$ value required for significant activity is 20 hours. Results of tests with steffisburgensimycin are as follows:

| No. Mice | Percent Survived | Delta Percent Survived | ST$_{50}$ | Delta ST$_{50}$ | Percent ST. Dev. |
|---|---|---|---|---|---|
| 18 | 77.7 | 72.6 | 105.6 | −28.9 | 32.8 |
| 19 | 78.9 | 63.9 | 76.9 | −67.4 | 63.6 |
| 19 | 68.4 | 53.4 | 100.1 | −44.3 | 55.6 |

We claim:

1. A composition of matter assaying at least 8.8 bio units/ml. of steffisburgensimycin, a compound which
   (a) is effective in inhibiting the growth of various Gram-positive bacteria; and in its essentially pure crystalline form;
   (b) is soluble in methanol, ethanol, isopropanol, methylene chloride, chloroform, ethylene dichloride, acetone, and methyl ethyl ketone;
   (c) has the following elemental analysis: C, 58.31; H, 5.52; 0, 35.89;
   (d) has an optical rotation of $[\alpha]_D^{25}$ +85° (c., .054%, methanol);
   (e) has a characteristic infrared absorption spectrum as shown in FIGURE 1 of the accompanying drawing; and
   (f) has a characteristic paper chromatographic pattern as shown in FIGURE 2 of the accompanying drawing.

2. A compound as defined in claim 1, steffisburgensimycin, in its essentially pure form.

3. A compound as defined in claim 1, steffisburgensimycin, in its essentially pure crystalline form.

4. A process for making the compound defined in claim 1 which comprises cultivating *Streptomyces steffisburgensis* in an aqueous nutrient medium under aerobic conditions until substantial steffisburgensimycin is produced and isolating the steffisburgensimycin.

5. A process for making the compound defined in claim 1 which comprises cultivating *Streptomyces steffisburgensis* var. *steffisburgensis* in an aqueous nutrient medium under aerobic conditions until substantial steffisburgensimycin is produced.

6. A process according to claim 5 which comprises cultivating *Streptomyces steffisburgensis* var. *steffisburgensis* in an aqueous nutrient medium containing a source of assimilable carbohydrate and assimilable nitrogen under aerobic conditions until substantial steffisburgensimycin is produced and isolating the steffisburgensimycin so produced.

7. A process according to claim 6 in which the isolation comprises filtering the medium and then contacting the filtrate with a water-immiscible solvent for steffisburgensimycin and recovering steffisburgensimycin from these solvent extracts.

8. A process according to claim 6 in which the nutrient medium is maintained at a temperature between about 18 and about 40° C. and the growth of the microorganism is carried on for a period of from 2 to 10 days.

No references cited.

ALBERT T. MEYERS, *Primary Examiner.*

JEROME D. GOLDBERG, *Assistant Examiner.*